United States Patent
Saxena et al.

(10) Patent No.: US 9,851,909 B2
(45) Date of Patent: Dec. 26, 2017

(54) INTELLIGENT DATA PLACEMENT

(71) Applicant: Samsung Electronics Co., Ltd., Suwon-si (KR)

(72) Inventors: Nirmal Raj Saxena, San Jose, CA (US); Bruce Cairns Moxon, Menlo Park, CA (US); Irving Michael Robinson, Menlo Park, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 124 days.

(21) Appl. No.: 14/858,842

(22) Filed: Sep. 18, 2015

(65) Prior Publication Data

US 2016/0085467 A1    Mar. 24, 2016

Related U.S. Application Data

(60) Provisional application No. 62/052,203, filed on Sep. 18, 2014.

(51) Int. Cl.
*G06F 3/06* (2006.01)
*G06F 11/10* (2006.01)

(52) U.S. Cl.
CPC ............ *G06F 3/0619* (2013.01); *G06F 3/065* (2013.01); *G06F 3/067* (2013.01); *G06F 3/0631* (2013.01); *G06F 3/0689* (2013.01); *G06F 11/1076* (2013.01)

(58) Field of Classification Search
CPC .. G06F 11/1076; G06F 3/0605; G06F 3/0607; G06F 3/0611; G06F 3/0622; G06F 3/0619; G06F 3/065; G06F 3/067; G06F 3/0631

See application file for complete search history.

(56) References Cited

U.S. PATENT DOCUMENTS

| | | | | |
|---|---|---|---|---|
| 5,765,200 A * | 6/1998 | McIlvain | ............ | G06F 3/0622 703/24 |
| 7,280,536 B2 * | 10/2007 | Testardi | ............ | G06F 3/0611 370/353 |
| 8,032,701 B1 * | 10/2011 | Glade | ............ | G06F 3/0605 711/114 |
| 2011/0078405 A1 * | 3/2011 | Asano | ............ | G06F 3/0607 711/170 |
| 2012/0290804 A1 * | 11/2012 | Eguchi | ............ | G06F 3/0605 711/162 |

OTHER PUBLICATIONS

VMware, Inc., Virtual machine file system: Technical overview and Best Practices, 2007, VMware Technical White paper, pp. 1 to 19.*

* cited by examiner

*Primary Examiner* — Shelly A Chase
(74) *Attorney, Agent, or Firm* — McAndrews, Held & Malloy, Ltd.

(57) ABSTRACT

A method of mapping a volume of storage to a plurality of pools of storage devices specified by a host having a host identification. The volume of data storage has a volume identification and a plurality of extents. The method includes assigning a first pool of storage devices to the volume of storage based on the host identification, and determining a mapping value based on the host identification and the volume identification for the first pool of storage devices. The method also includes determining a storage device index based on the mapping value and one or more extents in the plurality of extents, and mapping a portion of the extents to the first pool of storage devices based on the storage device index.

46 Claims, 11 Drawing Sheets

INTELLIGENT DATA PLACEMENT

RELATED APPLICATIONS

This application claims priority to U.S. Provisional Patent Application No. 62/052,203, filed Sep. 18, 2014. The above-identified application is hereby incorporated herein by reference in its entirety.

BACKGROUND OF THE INVENTION

The disclosure relates to a system for data storage, among other things, and in particular, a rack-mounted storage system for network data storage using hash mapping and redundancy.

Demand for storage capacity is on the rise. Current databases and virtual storage systems are generally capable of holding large amounts of data. With the rising demand of storage capacity, manageability, performance and reliable accessibility of data in the database are becoming essential. However, to date, current database and memory volume management of physical storage from multiple network storage devices using a single virtual storage are not intelligently managed, slower than needed, and not sufficiently reliable for efficient data center applications.

BRIEF SUMMARY

Certain embodiments of the present invention provide a network based storage system.

An exemplary embodiment provides a method of mapping a volume of storage to a plurality of pools of storage devices specified by a host having a host identification. The volume of data storage has a volume identification and a plurality of extents. The method includes assigning a first pool of storage devices to the volume of storage based on the host identification, and determining a mapping value based on the host identification and the volume identification for the first pool of storage devices. The method also includes determining a storage device index based on the mapping value and one or more extents of the plurality of extents, and mapping a portion of the extents to the first pool of storage devices based on the storage device index.

Another exemplary embodiment provides a networked storage system. The system includes a host that has a host identification, and that maps a volume of storage having a volume identification and a plurality of extents. The system also includes a plurality of pools of storage devices to distribute at least a portion of the extents of the volume of storage specified by the host. The system further includes a processor to assign a first pool of the plurality of pools of storage devices to the volume of storage based on the host identification, to determine a mapping value based on the host identification and the volume identification for the assigned first pool of storage devices, to determine a storage device index based on the mapping value and one or more of the extents, and to map at least a portion of the extents to the assigned first pool of storage devices based on the storage device index.

Yet another exemplary embodiment provides a method of mapping a volume of storage to a plurality of storage devices specified by a host having a host identification. The volume of data storage has a volume identification and a plurality of extents. The method includes determining a hash value based on the host identification and the volume identification for the plurality of storage devices, and retrieving a storage device index based on one or more of the extents, and assigning a storage device address of one of the storage devices in the first pool from the plurality of storage devices based on the storage device index. The method also includes mapping a portion of the plurality of extents to the first pool from the plurality of storage devices with the assigned storage device address, inserting a redundancy following the portion of the plurality of extents, and mapping the remaining portion of the plurality of extents following the inserted redundancy.

BRIEF DESCRIPTION OF SEVERAL VIEWS OF THE DRAWINGS

The features and utilities described in the foregoing brief summary, as well as the following detailed description of certain embodiments of the present general inventive concept below, will be better understood when read in conjunction with the accompanying drawings.

Figure 1:
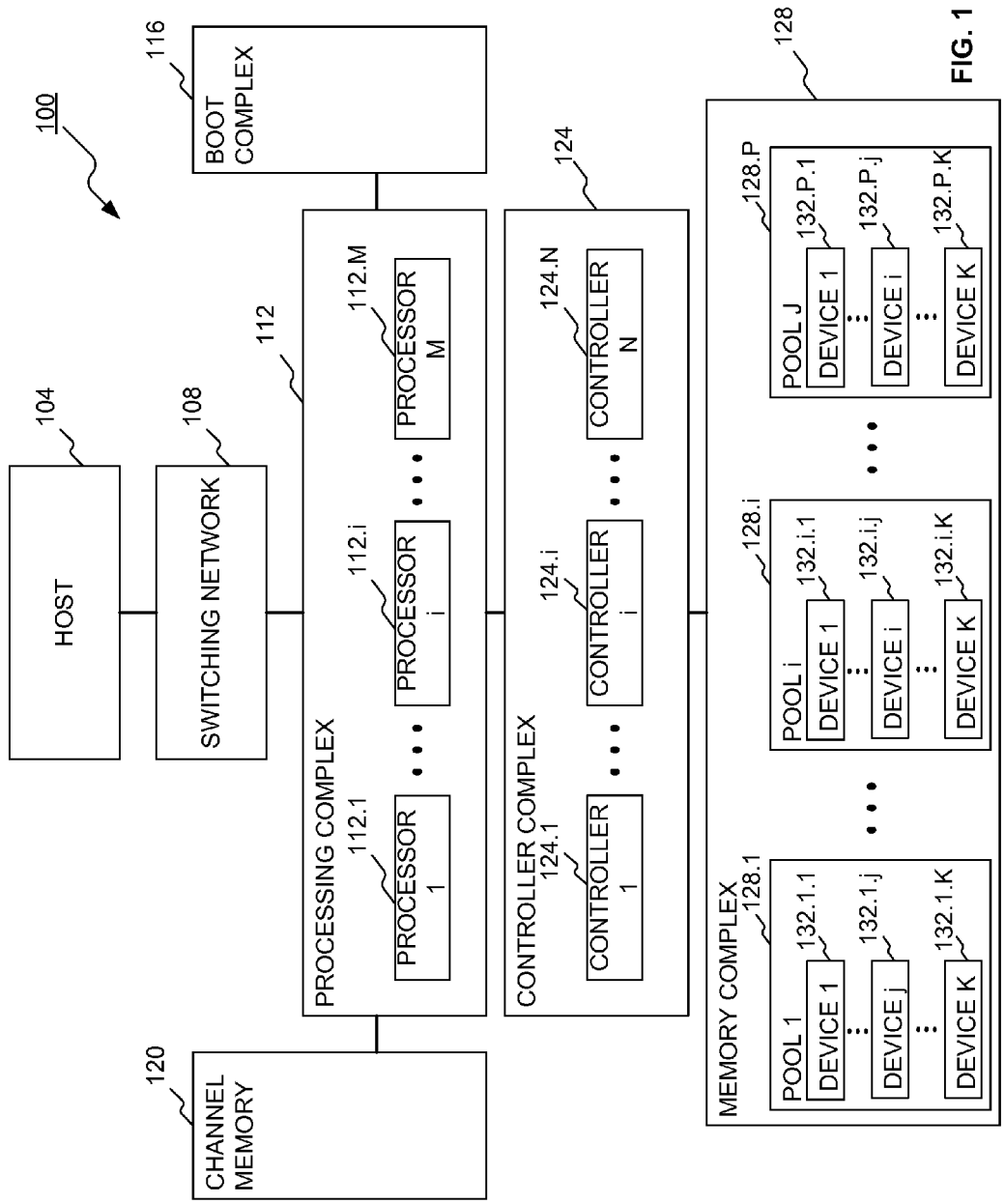
FIG. 1 is a diagram illustrating an embodiment of a network storage system.

For the purpose of illustrating the general inventive concept of the invention, certain embodiments are shown in the drawings. It should be understood, however, that the present invention is not limited to the arrangements and instrumentality shown in the attached drawings.

DETAILED DESCRIPTION

Reference will now be made in detail to the embodiments of the present general inventive concept, examples of which are illustrated in the accompanying drawings, wherein like reference numerals refer to the like elements throughout.

The embodiments are described below in order to explain the present general inventive concept while referring to the figures.

Before any embodiments of the invention are explained in detail, it is to be understood that the invention is not limited in its application to the details of construction and the arrangement of components set forth in the following description or illustrated in the drawings.

Advantages and features of the present invention and methods of accomplishing the same may be understood more readily by reference to the following detailed description and the drawings. The present general inventive concept may, however, be embodied in many different forms of being practiced or of being carried out in various ways and should not be construed as being limited to the embodiments set forth herein. Rather, these embodiments are provided so that this disclosure will be thorough and will fully convey the general inventive concept to those ordinarily skilled in the art. The present general inventive concept is defined by the appended claims. In the drawings, the thickness of layers and regions are exaggerated for visual clarity.

Also, the phraseology and terminology used in this document are for the purpose of description and should not be regarded as limiting. The use of the terms "a" and "an" and "the" and similar referents in the context of describing the invention (e.g., in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

As should also be apparent to one of ordinary skill in the art, the systems shown in the figures are models of what actual systems might be like. Some of the modules and logical structures described are capable of being implemented in software executed by a microprocessor or a similar device, or of being implemented in hardware using a variety of components including, for example, application specific integrated circuits ("ASICs"). A term like "processor" may include or refer to both hardware and/or software. No specific meaning is implied or should be inferred simply due to the use of capitalization.

Likewise, the term "component" or "module", as used herein, means, but is not limited to, a software or hardware component, such as a field programmable gate array (FPGA) or ASIC, which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and/or modules may be combined into fewer components and/or modules or further separated into additional components and/or modules.

Unless defined otherwise, all technical and scientific terms used herein have the same meaning as understood by one of ordinary skill in the art to which this invention belongs. Further, unless defined otherwise, all terms defined in generally used dictionaries should have their ordinary meaning.

Embodiments of the inventive concept relate to a method of allocating logical volume requested by a host.

FIG. 1 is a diagram illustrating an embodiment of a network storage system 100. The system 100 includes a host 104 requesting through a switching network 108 a volume of storage. The system 100 also includes a processing complex 112, which further includes one or more processors, depending on requirements and/or performance imposed by applications, to virtualize data on one or more storage devices into virtualized block-storage volumes presented to an application server. For example, in some embodiments, as discussed in detail hereinafter, the processing complex 112 executes one or more mapping functions to map virtualized volumes across pools of storage devices, while providing a redundancy capability to the virtualized volumes to enhance performance and availability transparent to the application server. In some embodiments, the virtualized volumes are visible to the host 104 as standard logical volumes having logical unit numbers.

In the embodiment shown, the processing complex 112 includes M processors, 112.1 through 112.M (with generic index 112.$i$ referring to the i-th processor). In some embodiments, the processing complex 112 includes two Broadcom multicore XLPII 964 SoC's, interfaced through an inter-chip interconnect (ICI), not shown.

A boot complex 116 is coupled to the processing complex 112 to provide a Basic Input/Output System (BIOS) and boot firmware code to the processing complex 112. For example, in some embodiments, during power-on using software convention and optional strap-options, the processing complex 112 boots with a single kernel image and in a two socket shared memory CC-NUMA (cache-coherent non-uniform memory access) mode.

The processing complex 112 is also coupled to a channel memory 120, and a controller complex 124. In some embodiments, the channel memory 120 includes a plurality of 72-bit DDR3 channel memory controller interfaces for each of the M processors 112.$i$ providing about 400 Gbps half-duplex read or write memory transaction bandwidth. In some embodiments, the channel memory 120 also includes single-error-correct and double-error-detect (SEC-DED) and nibble-error correction capability to enhance reliability of the system 100. In some embodiments, the channel memory 120 includes one or more 8 GB dynamic random access memory (DRAM).

Depending on performance requirements, the controller complex 124 can have one or more controllers to communicate with a memory complex 128. In embodiment shown, the controller complex 124 includes N controllers, 124.1 through 124.N (with generic index 124.$i$ referring to the i-th controller). In some embodiments, the controller complex 124 also includes a pair of switches (not shown). For example, in some embodiments, the switch is a PEX 8796 PCIe 3.0 switch.

The memory complex 128 includes a plurality of pools of storage devices 132. In the embodiment shown, the memory complex 128 includes P pools, 128.1 through 128.P (with generic index 128.$i$ referring to the i-th pool), and each of the P pools includes K storage devices 132 including devices 132.$i$.1 through 132.$i$.K (with generic index 132.$i$.j referring to the j-th storage device of the i-th pool). In some embodiments, the storage devices 132 are one or more solid-state drives, with 1 Terabyte (TB) of storage. Although an equal number of storage devices 132 are shown across the P pools, different numbers of storage devices 132 may also be used across the P pools in other embodiments depending on applications. In some embodiments, the storage devices 132 include a contiguous range of logical block addresses.

Figure 2:
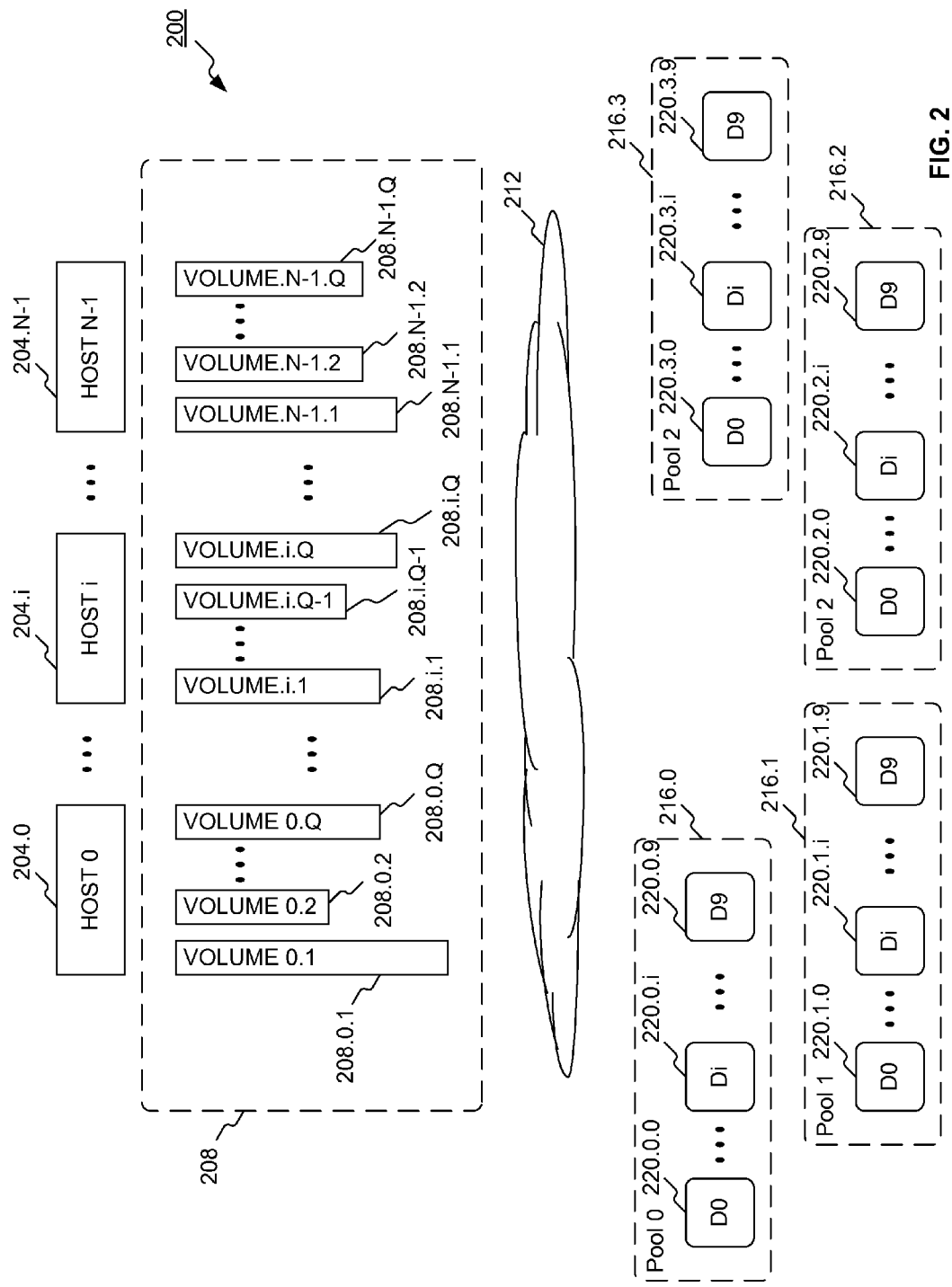
FIG. 2 illustrates an exemplary system of the system as shown in FIG. 1.

FIG. 2 illustrates an exemplary system 200 of the system 100 as shown in FIG. 1. The exemplary system 200 shows N hosts 204, 204.0 through 204.N-1, with generic index 204.$i$ referring to the (i+1)-th host. Each host 204.$i$ may access a plurality of logical volumes 208, for example, Q volumes. In some embodiments, the Q volumes may not have the same size. In the embodiment shown, host 0, 204.0, has Q logical volumes, 208.0.1 through 208.0.Q, with generic index 208.$i$.$j$ referring to the j-th volume of the (i+1)-th host or host (i+1). The exemplary system 200 also shows a mapping function 212, detailed hereinafter, that maps the logical volumes 208 into virtualized volumes in a plurality of pools 216 of storage devices 220. Specifically, in the embodiment shown, there are four (P=4) pools, 216.0 through 216.3, and each of the pools 216 has ten (K=10) storage devices. For example, pool 216.0 has ten storage devices 220.0.1 through 220.0.9, with generic index 220.$i$.$j$ referring to the j-th storage device of the (i+1)-th pool. In the embodiment shown in FIG. 2, the logical volume 208.0.1 visible by the host 0, 204.0, may be virtualized, shared, or distributed across a number of the storage devices 220.0.0 through 220.0.9. In some embodiments, the number of storage devices used for volume distribution or virtualization is a predetermined, and the predetermined number of storage devices is a power of two available within a pool, such as, for example, pool 216.0. In the embodiment shown, the number of storage devices 220.0.0 through 220.0.9 used for volume distribution or virtualization is predetermined to be eight, which is the maximum number of storage devices equaling to a power of two available within the pool 216.0 that has ten storage devices.

In some embodiments, each storage device 220.0.$i$ within a pool 216 is further grouped in a plurality of storage units, stripes or extents. Each extent is generally sized as a power of two bytes, and is on the order of one or more gigabytes in length, for example, 1 GB. Extents within a pool generally also have the same size. In some embodiments, each extent is further subdivided into sectors, not shown. In yet other embodiments, each sector contains a power-of-two string of contiguous bytes, in the order one to sixteen kilobytes (KBs) in size, with an optimized value of four kilobytes, which becomes a page size of the storage device 220. For example, a 4 kilobyte (KB) logical block operation from a host will result in one physical read or write on a storage device 220. In some embodiments, sectors are units of allocation of an extent to a storage device 220; that is, an extent is striped across a pool, each storage device 220 receives a sector sized chunk of data. In other embodiments, sectors are contained in a single storage device 220, and all sectors in a pool are the same size. A portion of the extents may be evenly distributed or mapped into a predetermined number of the storage devices or drives 220 in a pool 216 based on the storage device or drive index, where the predetermined number may be, for example, a power of two. In some embodiments, extents may comprise a plurality of contiguous memory blocks.

Figure 3A:
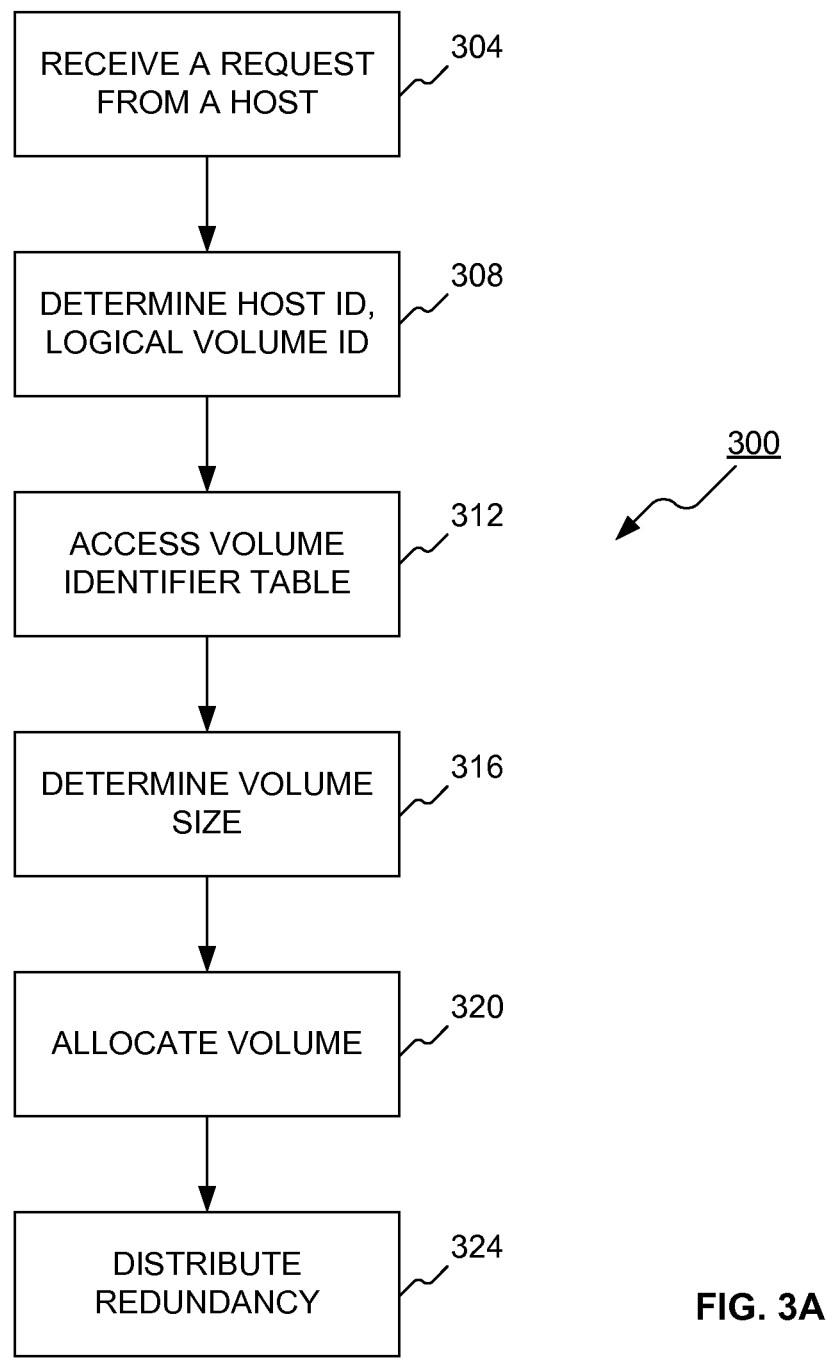
FIG. 3A illustrates an operational flow chart of a mapping process for mapping logical volume into storage device logical block in accordance with embodiments of the present invention.

FIG. 3A illustrates an operational flow chart of a mapping function or process 300 for mapping a volume of storage or logical volume into a plurality of pools of logical blocks or storage devices (for example, pools 216.0 through 216.3 of FIG. 2), similar to the mapping function 212 of FIG. 2, in accordance with embodiments of the present invention. In step 304, the mapping process 300 receives a request of logical volume from a host (for example, host 0 204.0 of FIG. 2). In some embodiments, the host is identified by a host identification (for example, host 0 204.0 of FIG. 2 has a host identification of "0"). The request may also include a size of the requested logical volume, and the logical volume is also associated with a logical volume identification. In step 308, the mapping process 300 determines the host identification and the logical volume identification from the request. Based on the host identification, the mapping process 300 accesses a volume identifier table, detailed hereinafter (e.g., volume table 440 of FIG. 4), at step 312. In some embodiments, each host, such as the host 204.0 of FIG. 2, is assigned a specific volume identifier table. At step 316, the mapping process 300 determines a volume size, for example, from the request. At step 320, the mapping process 300 allocates storage volumes for the request in one or more storage devices, similar to storage devices 132.1.1 through 132.1.8 of pool 1 of FIG. 1, or storage devices 220.0.0 through 220.0.7 of pool 0 of FIG. 2, based at least in part on the volume size. At step 324, the mapping process 300 also optionally distributes or inserts redundancy in the allocated storage volumes. For example, in some embodiments, the mapping process 300 may include striping and mirroring of the allocated storage volumes, as those used in a redundant array of inexpensive (independent) disks levels 1 and 0, or RAID10. In some embodiments, the mapping process 300 may insert parity blocks, similar to RAID6, into the allocated storage volumes. Although RAID10 and RAID6 have been described, other redundancy techniques, such as RAID2, RAID4, RAID5, and the like, can also be used, depending on requirements.

Figure 3B:
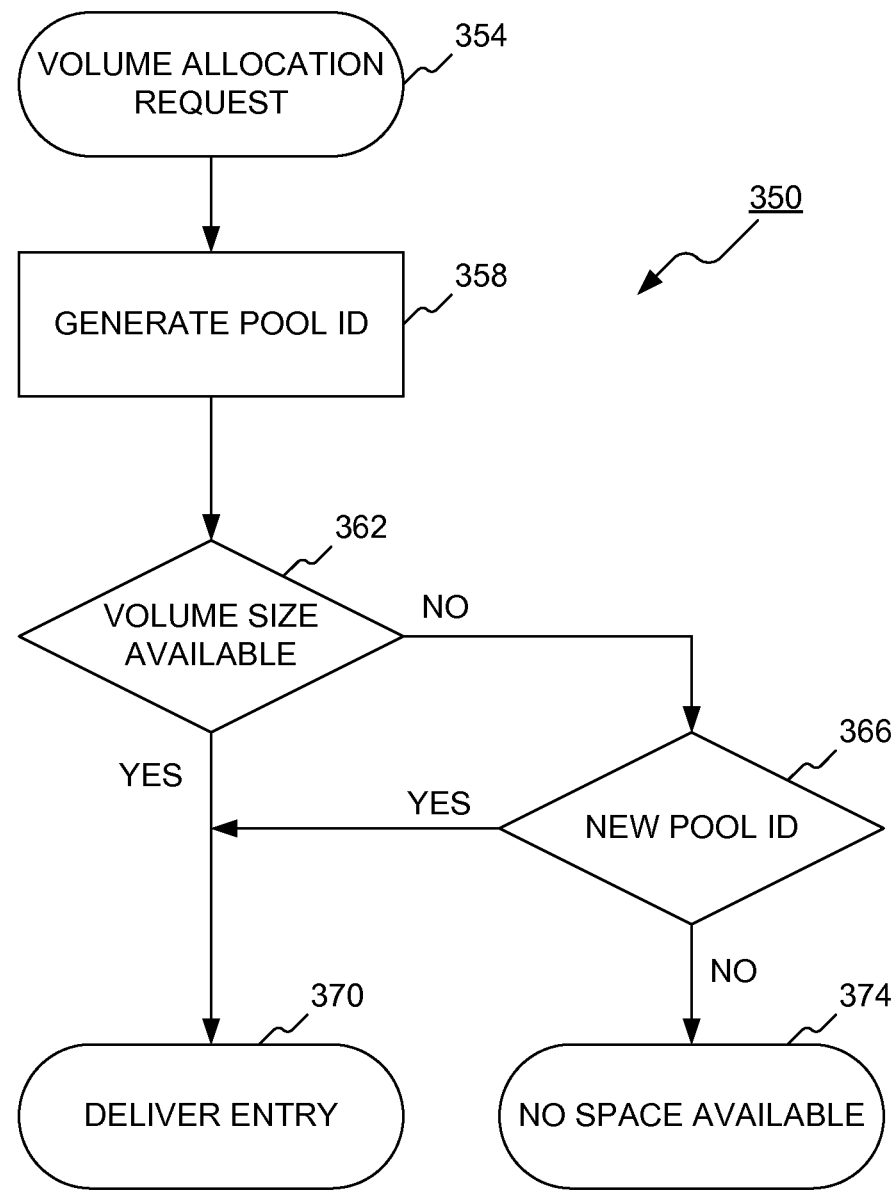
FIG. 3B illustrates an operational flow chart of an allocation process for allocating storage spaces or volumes in storage devices in accordance with embodiments of the present invention.

FIG. 3B illustrates an operational flow chart of an allocation process 350 for allocating storage spaces or volumes in storage devices, similar to step 320 of the mapping process 300 of FIG. 3A, in accordance with embodiments of the present invention. In step 354, the allocation process 350 receives an allocation request. In the embodiment shown, the allocation request includes the volume size, the host identification (for example, host 0 204.0 of FIG. 2 has a host identification of "0"), and the logical volume identification (for example, volume 0.1 208.0.1 of FIG. 2 has a logical volume identification of "0.1"), for example, from the request as discussed with respect to the mapping process 300 of FIG. 3A. In step 358, the allocation process 350 uses a mapping function to generate a pool identification based on the host identification and the logical volume identification. In some embodiments, the mapping function (for example 212 of FIG. 2) is a hash function that randomly determines a mapping value or a hash value. In some embodiments, the pool identification identifies and assigns which pool of storage devices 216, for example, the pool 216.0 of storage devices 220.0.0 through 220.0.9 of FIG. 2 will be used and allocated the storage spaces requested.

After a pool identification has been generated, at step 362, the allocation process 350 determines if the identified pool has the requested storage spaces available based on the volume size. If it is determined at step 362 that the requested volume size is unavailable in the identified pool, the allocation process 350 generates a new pool identification, and determines the newly identified pool has the requested storage spaces based on the volume size at step 366. If it is determined at step 362 that the requested volume size is available in the identified pool, the allocation process 350 creates an entry for the requested volume in the identified pool at step 370. If it is determined at step 366 that the newly identified pool has the requested storage spaces based on the volume size, the allocation process 350 similarly proceeds to step 370 to create an entry for the requested volume in the newly identified pool. However, if it is determined at step 366 that the newly identified pool cannot provide the requested storage spaces based on the volume size, the allocation process 350 returns an error message indicating that the requested storage spaces are unavailable.

Figure 4:
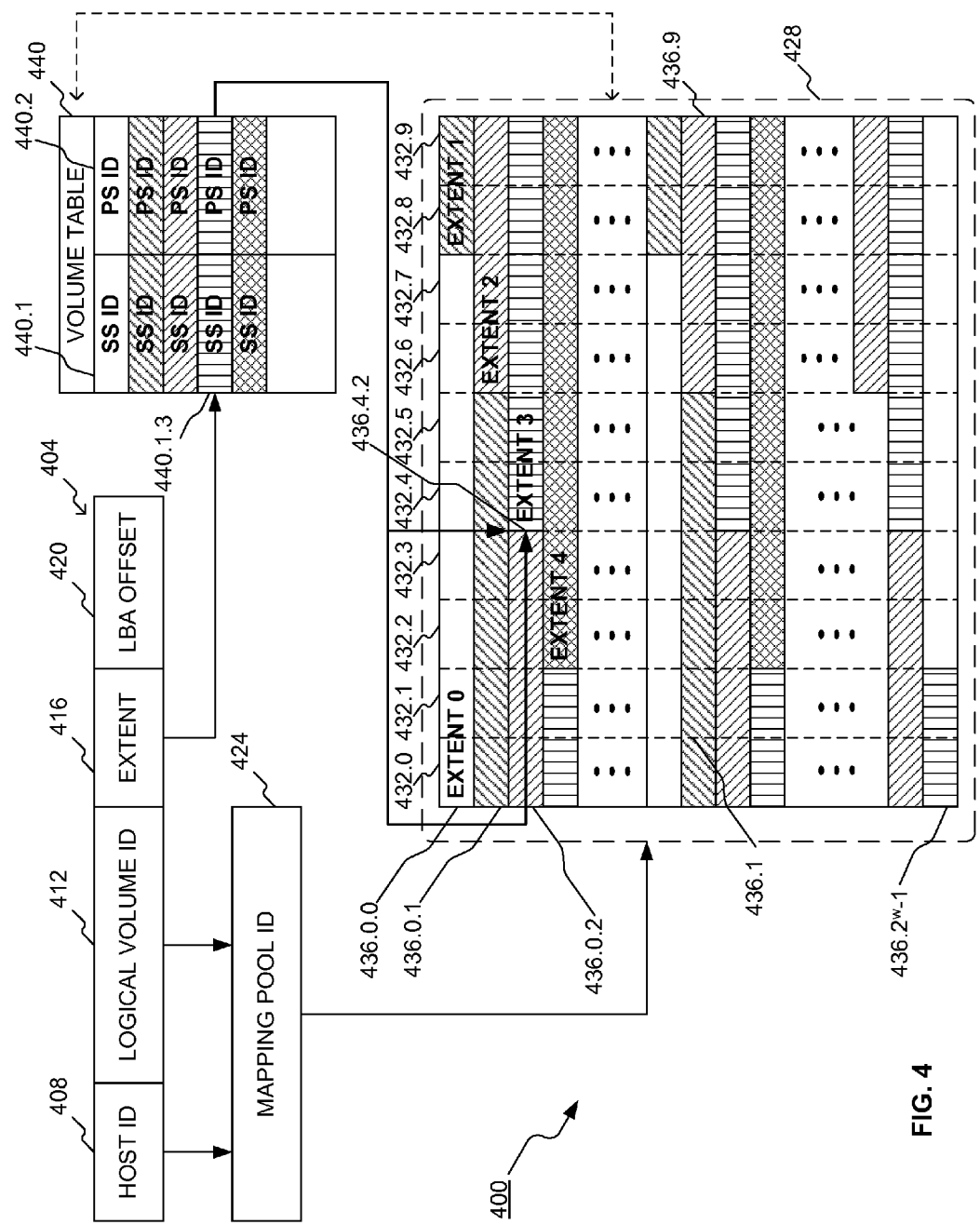
FIG. 4 illustrates an exemplary address mapping flow in accordance with the present invention.

FIG. 4 illustrates an exemplary address mapping flow 400, similar to the allocation process 350 of FIG. 3B, in accordance with the present invention. The address mapping flow 400 shows a host address 404. The host address 404 lists a host identification 408, for example, host 204.0 of FIG. 2, a logical volume identification 412 identifying a volume as seen by a host 204, an extent address or extent 416, and a logical block address (LBA) offset address 420. As discussed above with respect to FIG. 3B, a mapping pool identification 424 is determined from the host identification 408 and the logical volume identification 412 using a mapping function 212, for example, which may be a random hash function. In some embodiments, the mapping function 212 uniformly distributes the pool identification 424, for example, to reduce or lessen hot spotting—that two or more hosts 204 are assigned to and active in the same pool. In some embodiments, the address mapping flow 400, and particularly, the pool identification 424 is determined with the allocation process 350 of FIG. 3B.

In the embodiment shown in FIG. 4, the pool identification 424 refers to an exemplary pool 428, for example, pool 216.0 of FIG. 2. The pool 428 includes ten storage devices, 432.0 through 432.9. Each of the storage devices 432.0 through 432.9 is subdivided into $2^w-1$ stripes, 436.0.0 through 436.0.$2^w$-1, with generic index 436.$i$.$j$ referring to (j+1)-th stripe of the (i+1)-th storage device, and with generic index 436.$i$ referring to a generic stripe in (i+1)-th storage device. For example, stripe 436.9 refers to a stripe in the storage device 432.9, and stripe 436.1 refers to a stripe in the storage device 432.1. Similarly, strip 436.4.2 refers to the 3-rd stripe in storage device 432.4.

Each identified pool is also associated a volume table that keeps a record of addresses or entries used for a requested volume. In the embodiment shown, the pool 428 is associated with a volume table 440. In the embodiment shown, the volume table 440 lists two columns—device identification (SS ID) 440.1 and stripe identification (PS ID) 440.2. In some embodiments, the device identification 440.1 identifies which of the storage devices 432.0 through 432.9 will be used for the requested volume, and the stripe identification 440.2 identifies which stripes of the identified storage devices will be a starting stripe for the requested volume. The device identification 440.1 and the stripe identification 440.2 form a drive index which identifies a stripe address of a device within a pool that a requested volume is associated with, which is detailed hereinafter. Additionally, in some embodiments, the volume table 440 may also include other optional information, such as, for example, available extents in a pool starting defined by the device identification and the stripe identification.

FIG. 4 also illustrates that an extent 416 is mapped to the pool 428 by viewing the storage devices 432.0 through 432.9 with the pool 428 as a two-dimensional array or table. The two-dimensional array thus includes a plurality of coordinates, indices or drive indices, where a column represents an SS ID and a row represents a PS ID or a stripe 436.$i$, across the plurality of storage devices 432.0 through 432.9. In the embodiment shown, extents 416 are mapped to the storage devices 432.0 through 432.9 as contiguous grouping of sectors or stripes 436.$i$. As such, an extent 416 may begin at any SS ID and PS ID coordinate or drive index within an identified pool, for example, pool 428, as determined by a mathematical relationship between the number of storage devices 432 in the pool 428, the number of bytes in a stripe 436.$i$.$j$, and the number of stripes 436.$i$ in the extent 416. Extents 416 are thus placed in identified pool in an adjacent fashion. If the number of stripes 436.$i$ in an extent 416 is equal to the number of storage devices 432 in a pool, the extents 416 begin at 432.0. If the number of stripes 436.$i$ in an extent such as extent 416 is less than or greater than the number of storage devices 432.0 through 432.9 in the pool 428, the address mapping flow 400 results in a continuous wrapping effect down the length of the volume table 440. In the embodiment shown, the extent 416 points to SS ID 440.1.3 and PS ID 440.2.3. In such a case, the beginning address, coordinate, or drive index for the requested volume is identified by SS ID 440.1.3 and PS ID 440.2.3, which has an index of storage device 432.4 and an offset of two in stripe 436.2, resulting in a drive index of 436.4.2. Thus, in some embodiments, an index of a storage device or drive index may be determined based on the mapping value and the one or more extents such as extent 416 or by determining a storage device identification of at least one of the storage devices.

Figure 5:
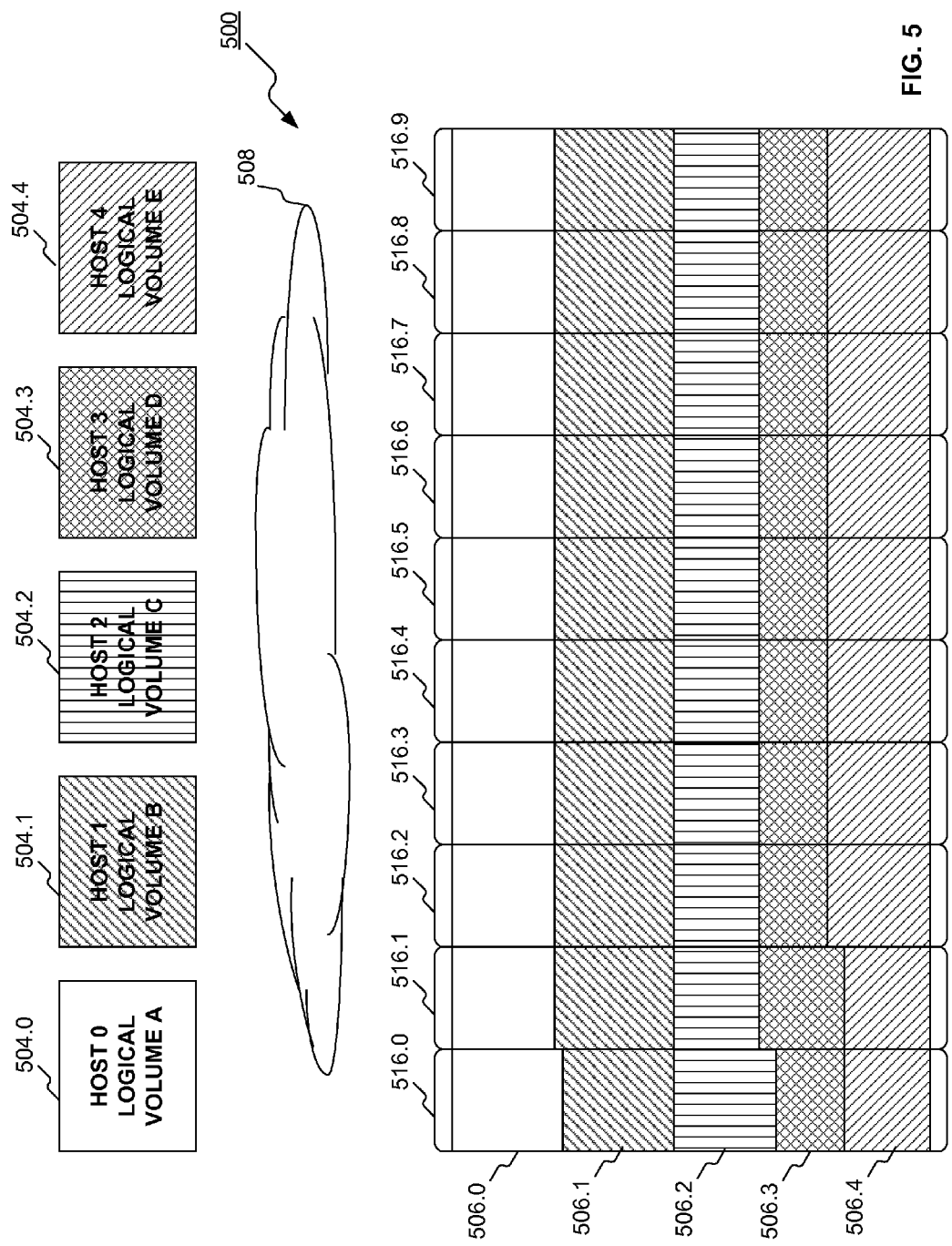
FIG. 5 illustrates a first allocation example in which multiple hosts allocate multiple volumes through a mapping function in a pool of storage devices.

FIG. 5 illustrates a first allocation example 500 in which multiple hosts 504 (504.0 through 504.4) allocate multiple volumes 506 (volume A through E) through a mapping function 508 in a pool 512 of storage devices 516 (516.0 through 516.9). In the first allocation example 500, the mapping function 508 is similar to the mapping process 300 of FIG. 3. In the embodiment shown, the hosts 504.0 through 504.4 evenly distributes map the requested volumes (volume A through E) to provisioned volumes 506.0 through 506.4 across the storage devices 516.0 through 516.9, respectively. In the embodiment shown, standard provisioning is applied to the volumes 506 (volume A through E) requested by the hosts 504.0 through 504.4 without redundancy.

Figure 6:
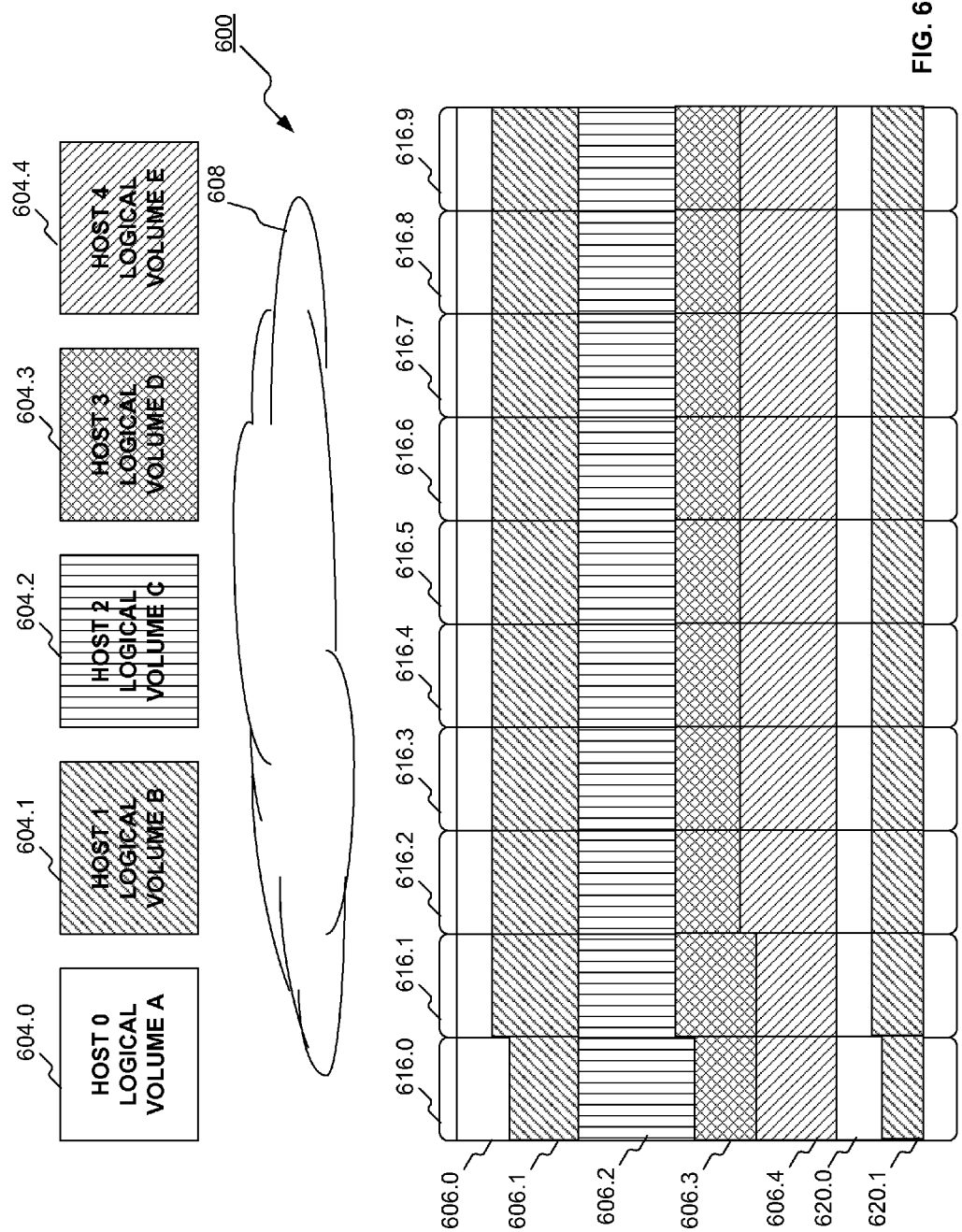
FIG. 6 illustrates a second allocation example in which multiple hosts allocate multiple volumes through a mapping function in a pool of storage devices without redundancy.

FIG. 6 illustrates a second allocation example 600 in which multiple hosts 604 (604.0 through 604.4) allocate multiple volumes 606 (volume A through E) through a mapping function 608 in a pool 612 of storage devices 616 (616.0 through 616.9) without redundancy. In the second allocation example 600, the mapping function 608 is similar to the mapping process 300 of FIG. 3, and maps the requested volumes 606 (volume A through E) to thin-provisioned volumes 606.0 through 606.4 using thin provisioning. In the embodiment shown, the hosts 604.0 through 604.4 evenly map the requested volumes (volume A through E) across the storage devices 616.0 through 616.9, with one or more additions 620.0 and 620.1 for overthrows of the thin-provisioned volumes 606.0 through 606.4. More additions may also be used depending on applications.

Figure 7:
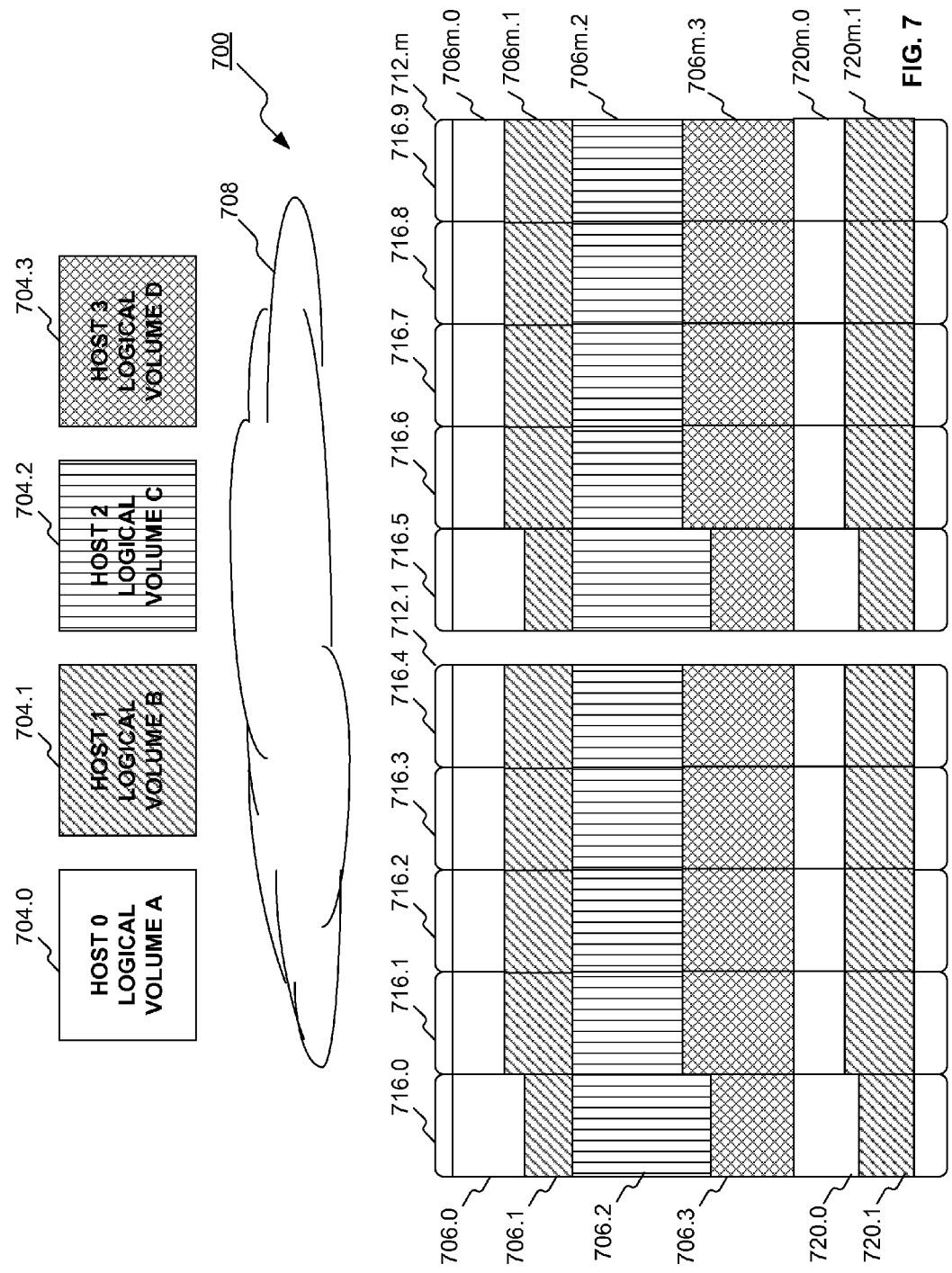
FIG. 7 illustrates a third allocation example in which multiple hosts allocate multiple volumes through a mapping function in a pool of storage devices with redundancy.

FIG. 7 illustrates a third allocation example 700 in which multiple hosts 704 (704.0 through 704.4) allocate multiple volumes (volume A through D) 706 through a mapping function 708 in a pool 712, which is subdivided into a first sub-pool 712.1 and a second sub-pool or a mirror sub-pool 712.$m$, of storage devices 716 (716.0 through 716.9) with redundancy in the same pool 712. In the third allocation example 700, the mapping function 708 is similar to the mapping process 300 of FIG. 3, and maps the requested volumes (volume A through D) to thin-provisioned volumes 706.0 through 706.3 using thin provisioning. In the third allocation example 700, a redundancy is also inserted or applied. In the embodiment shown, the redundancy applied includes RAID10, which further includes striping and mirroring. In such a case, the redundancy include striping the thin-provisioned volumes 706.0 through 706.3 in the pool 712.1, and mirroring the thin-provisioned volumes 706.0 through 706.3 in a corresponding pool 712.$m$. More specifically, the hosts 704.0 through 704.3 evenly map with a drive index as discussed above the requested volumes (volume A through D) to thin-provisioned volumes 706.0 through 706.3 across the storage devices 716.0 through 716.4, with one or more additions 720.0, 720.1 for overthrows of the thin-provisioned volumes 706.0 through 706.3 of the sub-pool 712.1. Similarly, the thin-provisioned volumes 706.0 through 706.3 and the thin-provisioned additions 720.$m$ are also mirrored with a mirrored drive index in the mirror storage devices 716.5 through 716.9 in the sub-pool 712.$m$ creating a plurality of mirrored volumes 706$m$.0 through 706$m$.3 and a plurality of thin-provisioned additions 720$m$.0 and 720$m$.1.

Figure 8:
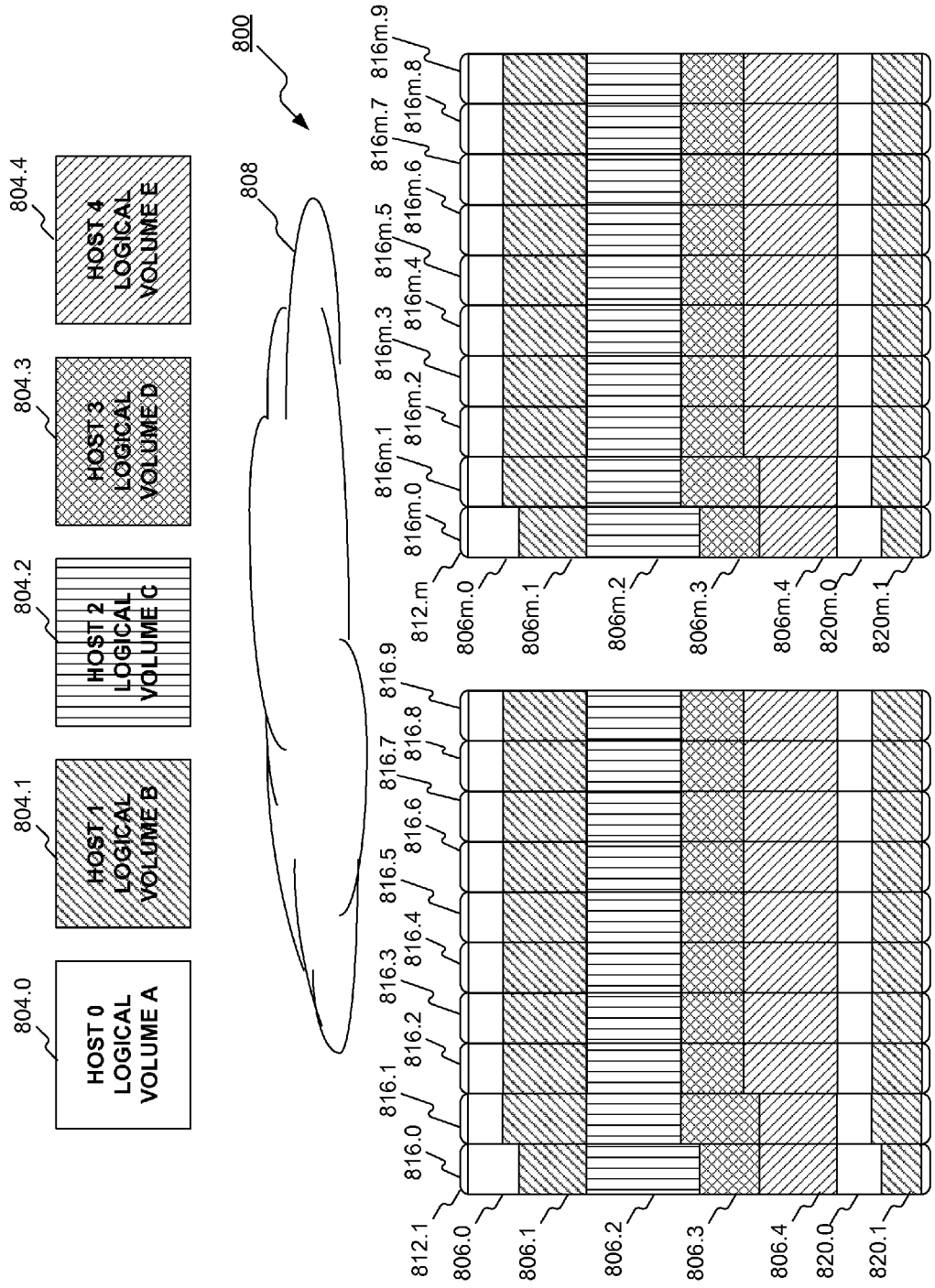
FIG. 8 illustrates a fourth allocation example in which multiple hosts allocate multiple volumes through a mapping function in a plurality of pools of storage devices using thin provisioning and redundancy.

FIG. 8 illustrates a fourth allocation example 800 in which multiple hosts 804 (804.0 through 804.4) allocate multiple volumes 806 (volume A through E) through a mapping function 808 in a first pool 812.1 and a different second or mirror pool 812.$m$ using thin provisioning and redundancy across the different pools 812.1 and 812.$m$. In the fourth allocation example 800, the first pool 812.1 has storage devices 816.0 through 816.9, and the second pool 812.$m$ has mirror storage devices 816$m$.0 through 816$m$.9. Further, the mapping function 808 is similar to the mapping process 300 of FIG. 3, and maps the requested volumes (volume A through E) to thin-provisioned 806.0 through 806.4 of the first pool 812.1. In the embodiment shown, the redundancy applied includes RAID10, which further includes striping and mirroring, as discussed above. Particularly, the hosts 804.0 through 804.4 evenly map the requested volumes (volume A through E) to the thin-provisioned volumes 806.0 through 806.4 across the storage devices 816.0 through 816.9 in the first pool 812.1, with one or more thin-provisioned additions 820.0 and 820.1 for overthrows of the thin-provisioned volumes 806.0 through 806.4 of the first pool 812.1. Similarly, the thin-provisioned volumes 806.0 through 806.4 and the thin-provisioned additions 820.0 and 820.1 are mirrored in the mirror storage devices 816$m$.0 through 816$m$.9 in the second pool 812.$m$ creating a plurality of mirrored thin-provisioned volumes 806$m$.0 through 806$m$.4 and a plurality of mirror thin-provisioned additions 820$m$.0 and 820$m$.1. Thus, in this embodiment, the requested volumes 806 are allocated across two different pools 812.1 and 812.$m$, with the pool 812.$m$ being a mirror of the pool 812.1.

Figure 9:
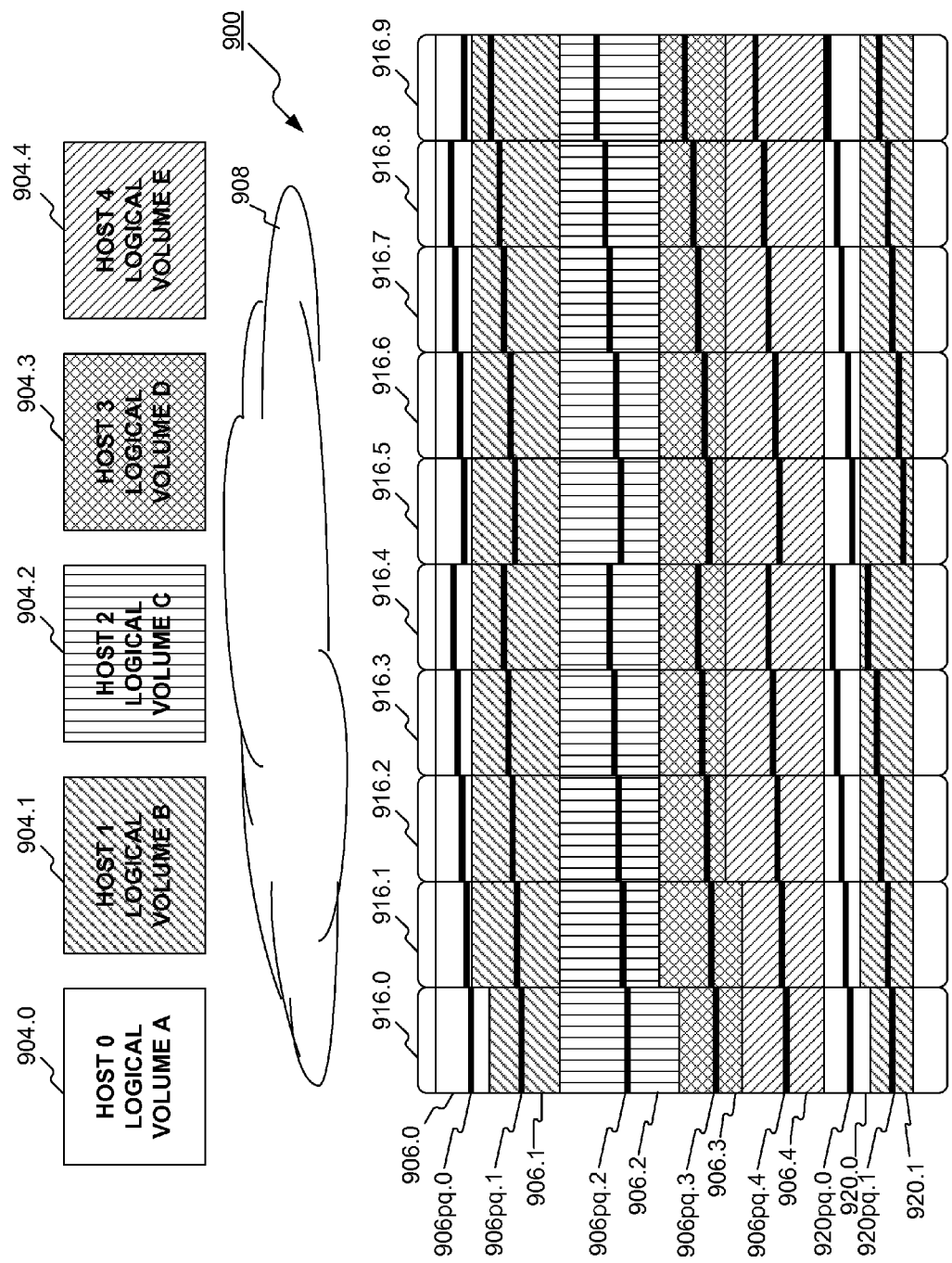
FIG. 9 illustrates a fifth allocation example in which multiple hosts allocate multiple volumes through a mapping function in a pool of storage devices using thin provisioning and redundancy.

FIG. 9 illustrates a fifth allocation example 900 in which multiple hosts 904 (904.0 through 904.4) allocate multiple volumes 906 (volume A through E) through a mapping function 908 in a pool 912 of storage devices 916 (916.0 through 916.9) using thin provisioning and redundancy. In the fifth allocation example 900, the mapping function 908 is similar to the mapping process 300 of FIG. 3, and maps the requested volumes (volume A through E) to paritied-volumes 906.0 through 906.4. In the embodiment shown, the redundancy applied includes RAID6, which further includes insertion of a plurality of PQ parity blocks. Further, the hosts 904.0 through 904.4 evenly map the requested volumes (volume A through E) to paritied volumes 906.0 through 906.4 across the storage devices 916.0 through 916.9 in the pool 912, with one or more thin-provisioned additions 920.0, 920.1 for overthrows of the paritied-volumes 906.0 through 906.4 of the pool 912. In the embodiment shown, a plurality of parity blocks 906*pq*.0 through 906*pq*.4, 920*pq*.0 and 920*pq*.1 are inserted in the paritied-volumes 906.0 through 906.4 and the thin-provisioned additions 920 in the pool 912.

Figure 10:
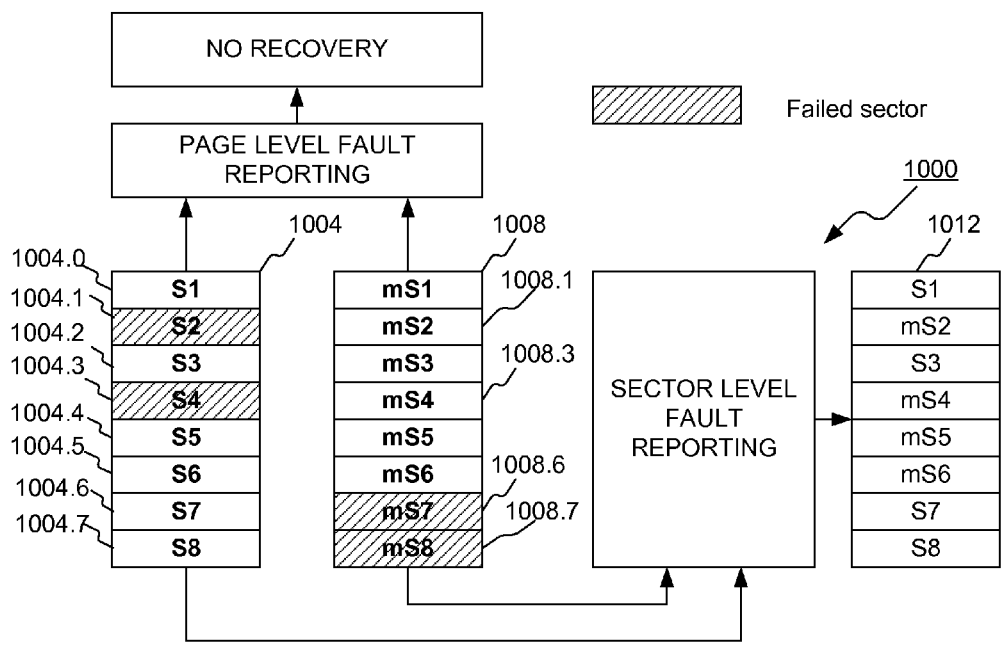
FIG. 10 illustrates a first exemplary mean-time-between-failure (MTBF) fault reporting using the mapping process of FIG. 3 and RAID10 redundancy.

FIG. 10 illustrates a first exemplary mean-time-between-failure (MTBF) fault reporting 1000 using the mapping process 300 of FIG. 3 and RAID10 redundancy, which involves 100% redundancy. In the first exemplary MTBF fault reporting 1000, a pool 1004, similar to pool 812.1 of FIG. 8, of storage devices 1004.0 through 1004.7 is mirrored in a mirror pool 1008, similar to pool 812.$m$ of FIG. 8, of storage devices 1008.0 through 1008.7. In the embodiment shown, a plurality of sectors 1004.1 and 1004.3 in the pool 1004 having a 4 kilobyte (KB) page have been determined to have failed, and a differently plurality of mirror sectors 1008.6 and 1008.7 in the different mirror pool 1008 have also been determined to have failed. If a page level fault report is used in recovering data in the failed sectors, no recovery can be achieved. However, according to the present invention, in response to having determined that a storage device has failed, the system 100 can recover a complete 4 KB page 1012 of data by using sector level fault reporting and by accessing (e.g., simultaneously) a pool of storage devices or drives. In the embodiment shown, the failed sectors 1004.1 and 1004.3 are replaced by their respective mirror versions 1008.1 and 1008.3, while the failed mirror sectors 1008.6 and 1008.7 can be substituted with sectors 1004.6 and 1004.7.

Figure 11:
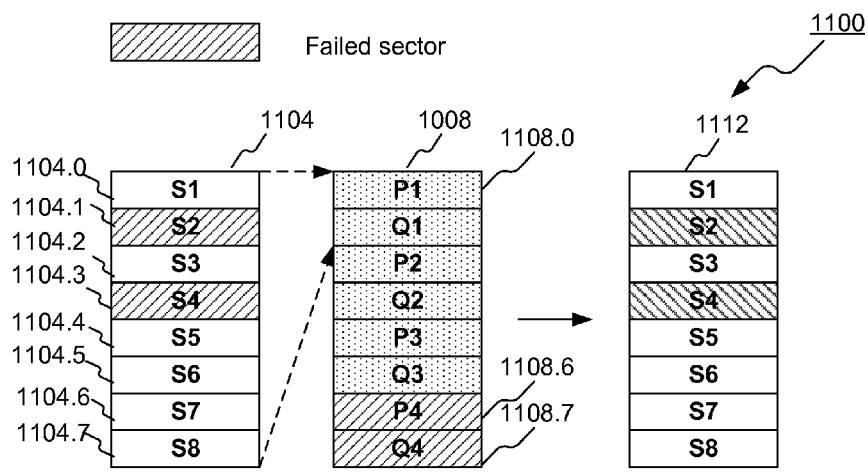
FIG. 11 illustrates a second exemplary MTBF fault reporting using the mapping process of FIG. 3 and RAID6 redundancy.

FIG. 11 illustrates a second exemplary MTBF fault reporting 1100 using the mapping process 300 of FIG. 3 and RAID6 redundancy, which involves 25% redundancy. In the second exemplary MTBF fault reporting 1100, a pool 1104, similar to 906.0 of FIG. 9, of storage devices 1104.0 through 1104.7 has its PQ parity blocks stored in a parity pool 1108, similar to 906*pq*.0 of FIG. 9, of storage devices 1108.0 through 1108.7. In the embodiment shown, a plurality of sectors 1104.1 and 1104.3 in the pool 1104 having a 4 KB page have failed, and a differently plurality of parity sectors 1108.6 and 1108.7 in the different parity pool 1108 have also failed. According to the present invention, in response to having determined that a storage device, for example, storage device 220.0.0 of FIG. 2, has failed, the system 100 can recover a complete 4 KB page 1112 of data by using sector level fault reporting and by accessing (e.g., simultaneously) a pool of storage devices or drives, for example, pool 216.0 of FIG. 2. In the embodiment shown, the failed sectors 1104.1 and 1104.3 are derived from the parity sectors 1108.0 and 1108.1.

The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Additionally, the logic flows depicted in the figures do not require the particular order shown, or sequential order, to achieve suitable results. Other steps also may be provided, or steps may be eliminated, from the described flows, and other components may be added to, or removed from, the described systems. Accordingly, other embodiments are within the scope of the following claims.

We claim:

1. A method of data storage for use with a network storage system having a host server, a processor, and a plurality of pools of physical storage devices for mapping a volume of storage to the plurality of pools of physical storage devices specified by the host server having a host server identification, the volume of data storage having a volume identification and a plurality of extents, the method comprising:
    assigning via the processor a first pool of the physical storage devices to the volume of storage based on the host server identification;
    determining via the processor a mapping value based on the host server identification and the volume identification for the first pool of physical storage devices;
    determining via the processor a storage device index based on the mapping value and one or more extents in the plurality of extents; and
    mapping via the processor a portion of the plurality of extents to the first pool of physical storage devices based on the storage device index.

2. A method of claim 1, wherein determining the mapping value comprises determining a hash value based on the host server identification and the volume identification.

3. A method of claim 2, wherein determining the hash value comprises randomly determining the hash value based on the host server identification and the volume identification.

4. A method of claim 1, wherein the method further comprising:
    allocating a second pool of storage devices for the volume of storage based on the host server identification; and
    mapping the remaining of the plurality of extents to the second pool of storage devices based on the storage device index.

5. A method of claim 1, wherein at least one of the physical storage devices in the first pool of physical storage devices comprises one or more solid-state drives.

6. A method of claim 1, wherein determining the physical storage device index comprises determining a storage device identification of at least one of the storage devices in the first pool of physical storage devices.

7. A method of claim 1, wherein at least one of the physical storage devices in the first pool of physical storage devices comprises a plurality of physical storage device stripes, and wherein determining the storage device index comprises determining an index of one of the storage device stripes.

8. A method of claim 1, wherein mapping a portion of the plurality of extents comprises evenly mapping the portion of the plurality of extents into a predetermined number of physical storage devices in the first pool of storage devices based on the storage device index.

9. A method of claim 8, wherein the predetermined number of physical storage devices is a power of two.

10. A method of claim 1, wherein the plurality of extents comprise a plurality of contiguous memory blocks.

11. A method of claim 1, further comprising inserting redundancy into the first pool of physical storage devices for the volume of storage.

12. A method of claim 11, wherein inserting redundancy comprises mirroring at least a portion of the volume of storage in the first pool of physical storage devices.

13. A method of claim 11, wherein inserting redundancy comprises stripping at least a portion of the volume of storage in the first pool of physical storage devices.

14. A method of claim 11, wherein inserting redundancy comprises inserting a parity block into the first pool of physical storage devices.

15. A method of claim 11, further comprising:
    determining if one or more storage devices of the first pool of physical storage devices has failed; and
    in response to having determined that the one or more storage devices has failed, recovering data of the one or more physical storage devices with the inserted redundancy.

16. A method of claim 1, further comprising simultaneously accessing one or more physical storage devices in the first pool of physical storage devices.

17. A networked storage system comprising:
    a host server having a host server identification, and configured to map a volume of storage having a volume identification and a plurality of extents;
    a plurality of pools of physical storage devices configured to distribute at least a portion of the plurality of extents of the volume of storage specified by the host server; and
    a processor configured to: assign a first pool from the plurality of pools of physical storage devices to the volume of storage based on the host server identification, determine a mapping value based on the host identification and the volume identification for the assigned pool of physical storage devices, determine a physical storage device index based on the mapping value and one or more of the plurality of extents, and map the at least a portion of the plurality of extents to the first pool from the plurality of pools of physical storage devices based on the storage device index.

18. A system of claim 17, wherein the mapping value comprises a hash value.

19. A system of claim 18, wherein the hash value is determined randomly.

20. A system of claim 17, wherein the processor is further configured to assign a second pool from the plurality of pools of physical storage devices for the volume of storage based on the host server identification, and to map the remaining of the plurality of extents to the second pool from the plurality of pools of physical storage devices based on the storage device index.

21. A system of claim 17, wherein one or more physical storage devices in the plurality of pools of physical storage devices comprise one or more solid-state drives.

22. A system of claim 17, wherein the storage device index comprises a storage device identification of at least one of the storage devices in the plurality of pools of physical storage devices.

23. A system of claim 17, wherein at least one of the physical storage devices in the first pool of the plurality of pools of physical storage devices comprises a plurality of storage device stripes, and wherein determining the storage device index comprises determining an index of one of the storage device stripes.

24. A system of claim 17, wherein the processor is further configured to evenly mapping the portion of the plurality of extents into a predetermined number of physical storage devices in the first pool from the plurality of pools of physical storage devices based on the storage device index.

25. A system of claim 24, wherein the predetermined number of physical storage devices is a power of two.

26. A system of claim 17, wherein the plurality of extents comprise a plurality of contiguous memory blocks.

27. A system of claim 17, wherein the processor is further configured to insert redundancy into the first pool from the plurality of pools of physical storage devices for the volume of storage.

28. A system of claim 27, wherein the redundancy comprises mirroring at least a portion of the volume of storage in the first pool from the plurality of pools of physical storage devices.

29. A system of claim 27, wherein the redundancy comprises stripping at least a portion of the volume of storage in the first pool from the plurality of pools of physical storage devices.

30. A system of claim 27, wherein the redundancy comprises a parity block.

31. A system of claim 17, wherein the processor is further configured to determine if one or more physical storage devices of the first pool of storage devices has failed, and, in response to having determined that one or more physical storage devices has failed, recovering data of the one or more physical storage devices with the inserted redundancy.

32. A system of claim 27, wherein the processor is further configured to simultaneously access the physical storage devices in the first pool from the plurality of pools of physical storage devices.

33. A method of data storage for use with a network storage system having a host server, a processor, and a plurality of pools of physical storage devices via mapping a volume of storage to the plurality of physical storage devices specified by the host server having a host server identification, the volume of data storage having a volume identification and a plurality of extents, the method comprising:
   determining via the processor a hash value based on the host server identification and the volume identification for the plurality of physical storage devices;
   retrieving via the processor a storage device index based on one or more of the plurality of extents;
   assigning via the processor a storage device address of one of the physical storage devices in the first pool from the plurality of pools of physical storage devices based on the storage device index;
   mapping via the processor a portion of the plurality of extents to the first pool from the plurality of pools of physical storage devices with the assigned storage device address;
   inserting via the processor a redundancy following the portion of the plurality of extents; and
   mapping via the processor the remaining portion of the plurality of extents following the inserted redundancy.

34. A method of claim 33, wherein determining the hash value is based on the host server identification and the volume identification and the hash value is randomly determined.

35. A method of claim 33, further comprising grouping the plurality of physical storage devices into a plurality of pools of equal number of physical storage devices.

36. A method of claim 33, wherein one of the physical storage devices in the first pool of physical storage devices comprises one or more solid-state drives.

37. A method of claim 33, wherein retrieving the storage device index comprises determining a storage device identification of at least one of the physical storage devices a first pool from the plurality of pools of physical storage devices from a predetermined volume table.

38. A method of claim 33, wherein at least one of the physical storage devices in the first pool from the plurality of pools of physical storage devices comprises a plurality of storage device stripes, and wherein retrieving the storage device index comprises determining an index of one of the storage device stripes from a predetermined volume table.

39. A method of claim 33, wherein mapping a portion of the plurality of extents comprises evenly mapping the portion of the plurality of extents into a predetermined number of the physical storage devices.

40. A method of claim 39, wherein a predetermined number of physical storage devices is a power of two.

41. A method of claim 33, wherein the plurality of extents comprise a plurality of contiguous memory blocks.

42. A method of claim 33, wherein inserting redundancy comprises mirroring at least a portion of the volume of storage in at least one of the plurality of physical storage devices.

43. A method of claim 33, wherein inserting redundancy comprises stripping at least a portion of the volume of storage in at least one of the plurality of physical storage devices.

44. A method of claim 33, wherein inserting redundancy comprises inserting a parity block in at least one of the plurality of physical storage devices.

45. A method of claim 33, further comprising:
   determining if one or more storage devices of the first pool from the plurality of pools of physical storage devices has failed; and
   in response to having determined that the one or more storage devices has failed, recovering data of the one or more physical storage devices with the inserted redundancy.

46. A method of claim 33, further comprising simultaneously accessing the one or more of the plurality of physical storage devices.

* * * * *